United States Patent
Morton et al.

(10) Patent No.: US 7,162,416 B2
(45) Date of Patent: *Jan. 9, 2007

(54) COMPRESSED AUDIO STREAM DATA DECODER MEMORY SHARING TECHNIQUES

(75) Inventors: Paul Morton, Vancouver (CA); Darwin Rambo, Cloverdale (CA)

(73) Assignee: Broadcom Corporation, Irvine, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 11/224,202

(22) Filed: Sep. 12, 2005

(65) Prior Publication Data

US 2006/0020475 A1    Jan. 26, 2006

Related U.S. Application Data

(63) Continuation of application No. 10/087,290, filed on Feb. 28, 2002, now Pat. No. 6,985,853.

(51) Int. Cl.
  *G10L 19/00* (2006.01)
(52) U.S. Cl. .................. 704/201; 382/305; 370/240.26
(58) Field of Classification Search ..................... None
  See application file for complete search history.

(56) References Cited

U.S. PATENT DOCUMENTS

| | | | |
|---|---|---|---|
| 5,374,916 A | 12/1994 | Chu | |
| 5,481,645 A * | 1/1996 | Bertino et al. | 704/270 |
| 5,627,533 A | 5/1997 | Clark | |
| 5,768,445 A | 6/1998 | Troeller et al. | |
| 5,940,479 A | 8/1999 | Guy et al. | |
| 6,208,273 B1 | 3/2001 | Dye et al. | |
| 6,259,695 B1 | 7/2001 | Ofek | |
| 6,310,981 B1 | 10/2001 | Makiyama et al. | |
| 6,343,263 B1 | 1/2002 | Nichols et al. | |
| 6,378,010 B1 | 4/2002 | Burks | |
| 6,633,608 B1 | 10/2003 | Miller | |
| 6,683,889 B1 | 1/2004 | Shaffer et al. | |
| 6,985,853 B1 * | 1/2006 | Morton et al. | 704/201 |
| 7,129,860 * | 10/2006 | Alvarez et al. | 341/51 |
| 2001/0005382 A1 | 6/2001 | Cave et al. | |

FOREIGN PATENT DOCUMENTS

WO  WO 01/72025   9/2001
WO  WO 01/86914   11/2001

* cited by examiner

*Primary Examiner*—Donald L. Storm
(74) *Attorney, Agent, or Firm*—McAndrews, Held & Malloy, Ltd.

(57) ABSTRACT

A decoder (10) decodes compressed data. A memory (44) stores the compressed data and stores operating data and operating code for a plurality of decompression algorithms requiring different amounts of memory for the operating data and operating code and requiring different amounts of memory to store compressed data corresponding to a predetermined amount of uncompressed data. A processor (42) is arranged to select one of the decompression algorithms, to allocate an amount of the memory for storing compressed data and operating data and operating code depending on the decompression algorithm selected and to decode the compressed data stored in the allocated amount of memory.

28 Claims, 2 Drawing Sheets

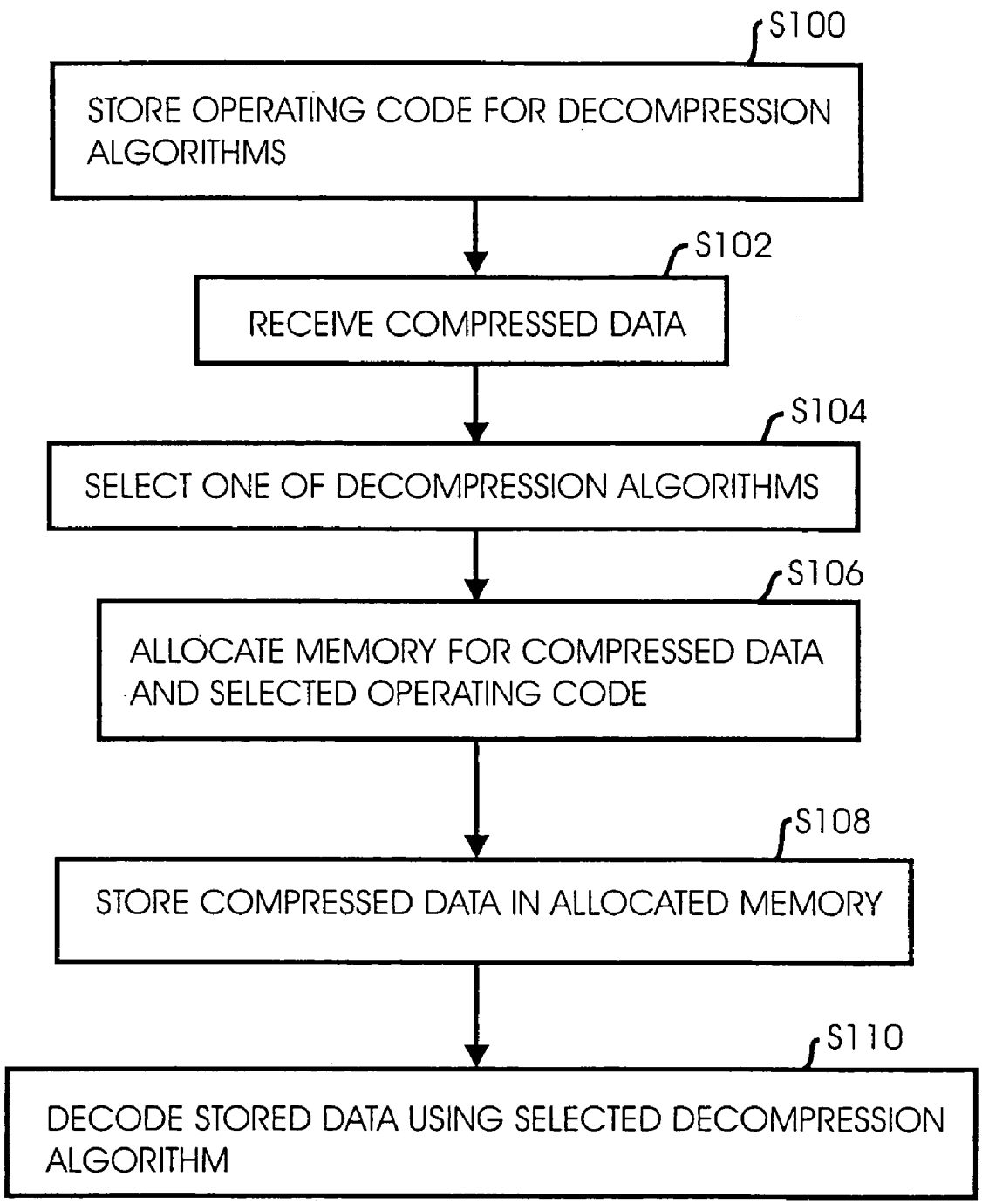

COMPRESSED AUDIO STREAM DATA DECODER MEMORY SHARING TECHNIQUES

CROSS-REFERENCE TO RELATED APPLICATIONS

The present application is a continuation of U.S. patent application Ser. No. 10/087,290, filed Feb. 28, 2002 now U.S. Pat. No. 6,985,853. The above-identified application is hereby incorporated by reference herein in its entirety.

BACKGROUND OF THE INVENTION

This invention relates to decoding of compressed audio stream data and particularly relates to allocating memory for the decoding of such data.

Decoding compressed audio stream data frequently involves removing jitter from the compressed data. Removing the jitter requires implementation of a jitter buffer, which stores an amount of compressed data, such as compressed packet voice data. Packets typically are put into the jitter buffer from a packet network at a non-constant rate (i.e., with jitter). Data is extracted from the buffer at a constant rate and played out into the telephone network. Previous decoders have sized the jitter buffer to hold a given amount of G.711 data (pulse code modulated (PCM) data transmitted at 64 kilo bits per second(kbps)). This jitter buffer size is usually expressed in bytes or the time duration of G.711 samples. The jitter buffer consumes a significant amount of memory. For example, a 200 millisecond (ms) jitter buffer requires at least 1600 bytes of memory (i.e. 200 ms of G.711 data requires 1600 bytes). Previous decoders do not have the means of re-sizing a jitter buffer whenever the voice decoder algorithm changes dynamically, based on the type of voice decoder algorithm in use. As a result, prior decoders have wasted memory and required excessively large memories. This invention addresses the problem and provides a solution.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

One apparatus embodiment of the invention is useful in a decoder for decoding compressed audio stream data. In such an environment, decoding apparatus comprises a memory arranged to store the compressed data and to store at least one of operating data and operating code for a plurality of decompression algorithms requiring different amounts of memory for the operating data and operating code and requiring different amounts of memory to store compressed data corresponding to a predetermined duration of uncompressed data. A processor is arranged to select one of the decompression algorithms, to allocate an amount of the memory for storing compressed data and at least one of operating data and operating code depending on the decompression algorithm selected and to decode the compressed data stored in the allocated amount of memory.

One method embodiment of the invention is useful for allocating memory for decoding compressed audio stream data. In such an environment, the memory is allocated by steps comprising storing at least one of operating data and operating code for a plurality of decompression algorithms requiring different amounts of memory for the operating data and operating code and requiring different amounts of memory to store compressed data corresponding to a predetermined amount of uncompressed data. One of the decompression algorithms is selected and an amount of the memory is allocated for storing compressed data and at least one of operating data and operating code depending on the decompression algorithm selected. At last a portion of the compressed data is stored in the allocated amount of memory, and the stored compressed data is decoded using the selected decompression algorithm.

Another embodiment of the invention is useful in a computer readable media encoded with executable instructions representing a computer program that can cause a computer to dynamically size memory by performing the tasks of storing at least one of operating data and operating code for a plurality of decompression algorithms requiring different amounts of memory for the operating data and operating code and requiring different amounts of memory to store compressed data corresponding to a predetermined amount of uncompressed data. One of the decompression algorithms is selected, and an amount of the memory is allocated for storing compressed data and at least one of operating data and operating code depending on the decompression algorithm selected. At last a portion of the compressed data is stored in the allocated amount of memory, and the stored compressed data is decoded using the selected decompression algorithm.

These and other advantages and novel features of the present invention, as well as details of an illustrated embodiment thereof, will be more fully understood from the following description and drawings.

BRIEF DESCRIPTION OF THE DRAWINGS

FIG. 2 is a flow diagram illustrating one method embodiment of the invention and describing a portion of the operation of the apparatus shown in FIG. 1.

DETAILED DESCRIPTION OF THE INVENTION

Figure 1:
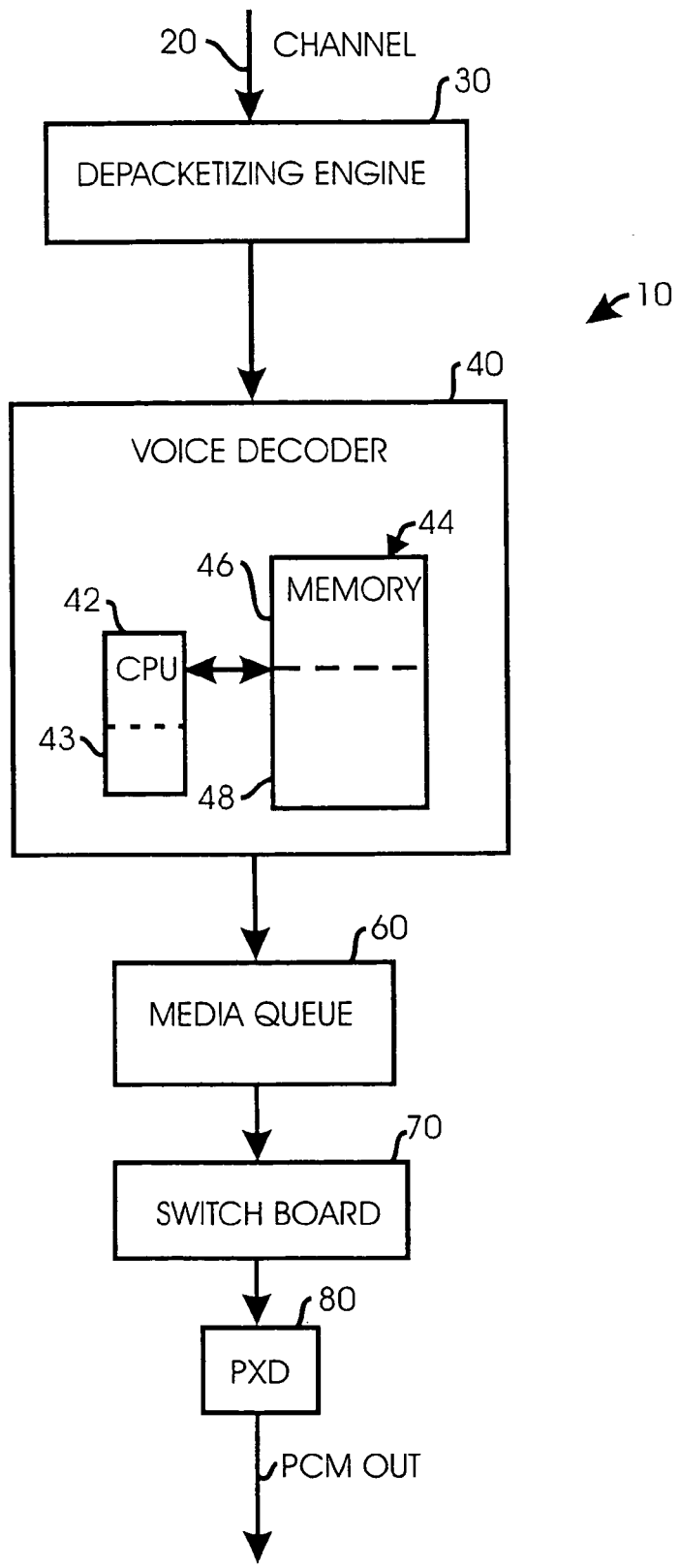
FIG. 1 is a schematic block diagram of a one embodiment of the invention.

The inventor has recognized that for a range of voice decompression algorithms, the more highly compressed the data the more operating data plus operating code the algorithm consumes. Furthermore, a lower bit rate algorithm requires a smaller jitter buffer to store a given duration of data. Prior decoders allocated a worst-case amount of memory for voice decompression algorithm operating data (plus optionally operating code) plus a worst-case amount of memory for a jitter buffer. The inventor recognized that both worst cases do not occur simultaneously. The embodiments described in this specification provide for dynamic resizing of a jitter buffer based on the voice decompression algorithm needed for decoding. Thus, the amount of memory allocated for decompression algorithm operating data (plus optionally operating code) plus compressed data can be changed depending on the algorithm used for decoding. One example of dynamic memory allocation is allocation during a phone call depending on the type of compressed data that needs to be decoded.

The embodiments of a decoder 10 made in accordance with the invention will be explained in the context of a voice over packet network (e.g., VoIP or VoATM) application. Referring to FIG. 1, packets of G.711, G.726, G.728 or another voice encoder (vocoder) algorithm encoded (i.e., compressed) voice data are received on a channel 20. The packets typically are generated by a vocoder, which forms part of a voice transmitter.

A depacketizing engine 30 identifies the type of packets received from the host (i.e., voice packet, DTMF packet, call progress tone packet, SID packet, etc.), and transforms the packets into frames that are protocol independent. The depacketizing engine 30 then transfers the voice frames (or voice parameters in the case of silence identifier (SID) packets) into a voice decoder 40. (The depacketizing engine 30 also may transfer DTMF frames into a DTMF queue not shown and transfer call progress tones into the call progress tone queue not shown.)

Voice decoder 40 includes a central processing unit (CPU) 42 and a memory 44. Memory 44 is a computer readable media that stores either operating data and operating code or operating data without operating code for decompression algorithms corresponding to the G.711, G.726, G.728 or another vocoder algorithm encoded data. The packets of data include information identifying the type of encoded data (e.g., G.711, G.726 or G.728 encoded data). In response to this information, CPU 42 selects the appropriate algorithm required for decoding the data and allocates an amount of memory 44 for storing compressed data and either operating data and operating code or operating data without operating code for the selected algorithm. CPU 42 then stores either the operating data and operating code or operating data without operating code for the algorithm in memory 44 (if the operating data and operating code is not already located in memory 44) and stores compressed data from engine 30 in the allocated memory. For example, a portion 46 of memory 44 is used to store operating data and operating code for the selected algorithm and a portion 48 of memory 44 is used to store compressed data from engine 30.

The allocation of memory may occur at the beginning of a phone call represented by compressed voice data received on channel 20. Thus, CPU 42 dynamically allocates memory 40 as needed depending on the type of compressed data used for the call and the type of decompression algorithm required to decode the data.

CPU 42 then removes jitter from the compressed data stored in memory portion 48, decodes the compressed data from memory portion 48 and transmits the resulting decompressed data to a media queue 60. Queue 60 may be used for various purposes, but is not needed for all applications. For example, a tone generator may overwrite queue 60 to generate DTMF tones. The data from the queue 60 is transmitted to a switch board 70 and then to a physical device (PXD) 80, which provides two way communication with a telephone or a circuit-switched network, such as a PSTN line (e.g. DS0) carrying a 64 kb/s pulse code modulated (PCM) signal, i.e., digital voice samples.

CPU 42 includes a program memory 43, which stores computer code representing an algorithm by which the memory allocating functions described in this specification are performed. This computer code may include the operating code for the decompression algorithms. Note that some implementations may execute the decompression algorithm operating code directly from program memory 43 or may instead copy operating code for a specific decompression algorithm to memory 44 and execute it directly from memory 44. Those skilled in communications and programming are able to write such code from the functions described in this specification.

Referring to FIG. 2, the decoder shown in FIG. 1 operates to allocate memory in the following manner. In step S100, CPU 42 stores either operating data and operating code or operating data without operating code for decompression algorithms of the types previously described. In step S102, compressed data of the type previously described is received from channel 20 at the beginning of a call. In step S104, information in the data is analyzed by CPU 42 to determine the type of compression used for the call, and an appropriate one of the decompression algorithms is selected. In step 106, an appropriate amount of memory 44 is allocated for compressed data and for either operating data and operating code or operating data without operating code for the selected decompression algorithm. In step S108, either operating data and operating code or operating data without operating code is stored in memory portion 46 and compressed data is stored in memory portion 48. In step S110, the compressed data stored in memory portion 48 is decoded, including the removal of jitter by well-known algorithms.

The steps shown in FIG. 2 are used to implement a gateway packet voice exchange service (PVE). The memory consumption of the PVE Service is affected by its compilation parameters. There are two main factors affecting memory 44 consumption:

(1) The amount of either operating data and operating code or operating data without operating code requiring storage in portion 46 of memory 44 varies with the combination of vocoders chosen via compilation parameters. More complex vocoders generally require more operating data and operating code.

(2) The amount of compressed data requiring storage in portion 48 of memory 44 varies with a parameter, such as XCFG_GLOBAL_MAX_JITTER_MSEC, which represents the maximum duration of audio stream signal (e.g., voice) that can be generated from the compressed data. Compressed data of greater complexity generally can generate a longer duration of voice signal and sound with fewer stored bytes.

Since jitter buffer duration is expressed in milliseconds (ms), the actual consumption in bytes of compressed data is dependent upon the type of compressed data stored within portion 48 of memory 44. For example, 200 ms of G.711 encoded data requires 1600 bytes, whereas 200 ms of G.728 encoded data requires 400 bytes. Each vocoder consumes a different amount of memory while it is running. Generally more complex vocoders consume more operational data and operational code. However the more complex vocoders have a lower bit rate and therefore need less coded data in memory portion 48 to generate the same duration of audio stream signal. The PVE Service exploits this trade-off between vocoder decoder operational memory (i.e. instance memory) and compressed data memory to reduce its overall memory consumption. For an example, where operational code is not stored in memory 44, if the PVE Service supports G.711, G.726 and G.728 encoded data, CPU 42 allocates memory 44 according to the expression:

```
PVE_memory = MAXIMUM (
    G711d_inst + XCFG_GLOBAL_MAX_JITTER_MSEC*8,
    G726d_inst + XCFG_GLOBAL_MAX_JITTER_MSEC*5,
    G728D_inst + XCFG_GLOBAL_MAX_JITTER_MSEC*2 )
```

Where Gxxxd_inst represents the amount of decoder operational data stored in memory portion 46 for the G.xxx vocoder, XCFG_GLOBAL_MAX_JITTER_MSEC*x represents the amount of compressed data stored in memory portion 48 for the G.xxx vocoder, and PVE_memory represents the total amount of memory allocated in memory 44 for the selected vocoder.

The foregoing method of resizing memory 44 based on the decompression algorithm type saves memory compared to statically sizing the memory 44 for the worst case memory requirement. For statically sizing a memory able to hold 200 ms of G.711 encoder data;

Required memory 44 amount =
   MAXIMUM (G711d_inst, G726d_inst, G728_inst) +
   XCFG_GLOBAL_MAX_JITTER_MSEC*8

Typical values for the above example are:

G711d_inst = 16 bytes
   G726d_inst = 68 bytes
   G728d_inst = 2020 bytes
   XCFG_GLOBAL_MAX_JITTER_MSEC = 200

Thus the memory saving by not using a static memory equals 1200 bytes (i.e., 1600 bytes required for G.711 minus 400 bytes required for G.728).

Although memory portions 46 and 48 have been shown as distinct and separate in FIG. 1, those skilled in the art will recognize that the memory portions could be arranged in other ways, such as interleaved.

While the invention has been described with reference to one or more preferred embodiments, those skilled in the art will understand that changes may be made and equivalents may be substituted without departing from the scope of the invention. For example, although only a single channel is shown in FIG. 1, the invention can be used with multiple channels. Typically, a chip used to implement the invention would service hundreds of channels. As a result, the amount of memory saved by such a chip is substantial. The depacketizing engine and decoder shown in FIG. 1 may be repeated for each channel, or depending on the size of memory 44 and speed of CPU 42, a single memory and CPU may be used for more than one channel.

In addition to memory 44, computer readable media within the scope of the invention include magnetic media, such as floppy disks and hard drive, as well as optical media, including CD-ROMs and DVDs.

In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. A decoder that decodes compressed data that is received by the decoder, comprising:
   a memory; and
   a processor operatively coupled to the memory and supporting a plurality of decompression algorithms,
   wherein the processor selects a decompression algorithm from the plurality of decompression algorithms based on at least an analysis of the compressed data, and
   wherein the processor allocates a particular amount of the memory for storing at least the compressed data based on at least the selected decompression algorithm.

2. The decoder according to claim 1, wherein the allocated portion of the memory comprises a portion that stores decompression algorithm operating data for the selected decompression algorithm and a second portion that stores an amount of compressed data suitable for the selected decompression algorithm.

3. The decoder according to claim 2, wherein the first portion stores decompression algorithm operating code for the selected decompression algorithm.

4. The decoder according to claim 1, wherein the compressed data comprises compressed voice data.

5. The decoder according to claim 1, wherein the decompression algorithms comprise voice data decompression algorithms.

6. The decoder according to claim 1,
   wherein the decoder decodes compressed data from a phone call, and
   wherein the processor selects the decompression algorithm and selects the particular amount at the memory during the phone call.

7. The decoder according to claim 1,
   wherein the decompressed data comprises identification data that identifies the compression algorithm used to encode the compressed data, and
   wherein the processor selects the decompression algorithm in response to at least the identification data.

8. The decoder according to claim 1,
   wherein the processor allocates a first amount of memory for storing the compressed data based on at least a selected first decompression algorithm, and
   wherein the processor allocates a second amount of memory for storing the compressed data based on at least a selected second decompression algorithm.

9. The decoder according to claim 1, wherein the memory comprises a jitter buffer that resizes based on at least the selected decompression algorithm.

10. The decoder according to claim 1, wherein the decoder is a voice decoder.

11. The decoder according to claim 1, wherein the memory comprises a jitter buffer that resizes based on at least a bit rate of the selected decompression algorithm.

12. The decoder according to claim 1, wherein the particular amount of memory stores decompression algorithm operating data and the compressed data.

13. The decoder according to claim 1, wherein the particular amount of memory stores decompression algorithm operating data, decompression algorithm operating code and the decompressed data.

14. The decoder according to claim 1, wherein the compressed data comprises voice decoder algorithm encoded voice data.

15. The decoder according to claim 1, wherein the processor removes jitter from the compressed data stored in the memory.

16. The decoder according to claim 1, wherein the processor dynamically allocates the particular amount of memory depending on a type of the compressed data and the selected decompression algorithm.

17. The decoder according to claim 1, wherein the compressed data comprises compressed data used in a phone call.

18. The decoder according to claim 1, wherein the decoder is part of a voice-over-packet network.

19. The decoder according to claim 1, wherein the particular amount of memory allocated by the processor changes with a selection of a different decompression algorithm.

20. The decoder according to claim 1, wherein the decoder is integrated on an integrated chip that services a plurality of channels, each channel carrying respective compressed data.

21. A method that dynamically allocates memory for decoding compressed data received by a decoder, comprising:
   (a) supporting a plurality of decompression algorithms;
   (b) analyzing the compressed data received by the decoder;
   (c) selecting a decompression algorithm from the plurality of decompression algorithms based on the analyzed compressed data;
   (d) allocating an amount of the memory for storing at least the compressed data and operating data based on at least the selected decompression algorithm; and
   (e) storing the operating data and at least a portion of the compressed data in the allocated amount of the memory.

22. The method according to claim 21, wherein (d) comprises allocating the amount of the memory for storing at least the compressed data, the operating data and the operating code based on at least the selected decompression algorithm.

23. The method according to claim 21, wherein (d) comprises (d)(1) allocating a first amount of the memory for storing the operating data for the selected decompression algorithm and (d)(2) allocating a second amount of the memory for storing the at least the portion of the compressed data.

24. The method according to claim 23, wherein (d)(1) comprises allocating the first amount of the memory for storing operating code and the operating data for the selected decompression algorithm.

25. The method according to claim 21,
   wherein the compressed data comprises compressed voice data, and
   wherein the decompression algorithms comprise voice data decompression algorithms.

26. The method of claim 25, wherein (c) and (d) are performed during a phone call that generates the compressed data.

27. The method according to claim 21, wherein the compressed data comprises identification data that identifies a particular compression algorithm that was used to encode the compressed data.

28. The method according to claim 21, wherein jitter is removed from the portion of the compressed data stored in the allocated amount of memory.

* * * * *